Inventor
Carl A. Flood
by Roberts, Cushman & Grover
Att'ys

Inventor
Carl A. Flood
by Roberts, Cushman & Grover
Att'ys

Inventor
Carl A. Flood
by Roberts, Cushman & Grover
Att'ys

Dec. 1, 1959 C. A. FLOOD 2,914,768
MACHINE FOR PINNING TICKETS TO ARTICLES
Filed March 16, 1956 10 Sheets-Sheet 7

Inventor
Carl A. Flood
by Roberts, Cushman & Grover
Attys

Dec. 1, 1959          C. A. FLOOD          2,914,768
MACHINE FOR PINNING TICKETS TO ARTICLES
Filed March 16, 1956          10 Sheets-Sheet 8

Inventor
Carl A. Flood
by Roberts, Cushman & Grover
Att'ys

Inventor
Carl A. Flood
by Roberts, Cushman & Grover
Att'ys

Dec. 1, 1959 — C. A. FLOOD — 2,914,768
MACHINE FOR PINNING TICKETS TO ARTICLES
Filed March 16, 1956 — 10 Sheets-Sheet 10

Inventor
Carl A. Flood
by Roberts, Cushman & Grover
Att'ys

United States Patent Office 2,914,768
Patented Dec. 1, 1959

2,914,768

MACHINE FOR PINNING TICKETS TO ARTICLES

Carl A. Flood, Framingham, Mass., assignor to Dennison Manufacturing Company, Framingham, Mass., a corporation of Massachusetts Application March 16, 1956, Serial No. 572,052

17 Claims. (Cl. 1—118)

A principal object of the invention is to provide for pinning a ticket to an article, for example a fabric or garment, in such manner that the pin will strongly resist loosening or dislodgment of the ticket as the article is handled, and yet the pin will not catch on other articles or the hands of those who handle the article. A further object is to accomplish this result in a way such that withdrawal of the pin does not injure the article.

Another object is to pin the ticket to the article in such manner that although the pin can be readily withdrawn without danger of injury to the article, nevertheless one can readily detect any case in which the ticket has been shifted from one article to another.

Although applicable to various types of tickets, the invention is of special utility in the pinning of single ply tickets where the problem of accomplishing these objects is more difficult than in case tickets of more complicated construction are used. The invention will be described as applied to pinning tickets of the type described in my copending application for Pin Tickets, Serial No. 572,051, filed on the same date as this present application.

As will be evident from this specification and its drawings, the present invention is particularly concerned with the provision of pin-bending mechanism for crimping a pointed end of the pin transversely of the surface of the ticket without bearing against the point itself of the pin, thus avoiding the formation of a hook or barb which would tend to catch in the article during removal of the pin.

The invention is further concerned with the accurate guidance of the pin during insertion, with the support of the pin in such manner that the bending to which the pin is subjected will not stretch the fabric to which the pin holds the ticket, and with making the final bent shape of the pin independent of the thickness of the fabric or other article.

In preferred embodiments of the invention, not only is the leading end portion of the pin bent transversely of the surface of the ticket, but the rear end portion is also bent transversely of the surface of the ticket, so that both ends lie against the surface of the ticket. Although the invention is applicable to the pinning of tickets with pins having conventional heads at their rear or trailing ends, the provision of pin-bending mechanism for the rear end of the pin renders practicable the use of truly headless pins, whose rear ends have nothing corresponding to the head of a conventional pin. With these truly headless pins the guiding channel of the pin-driving mechanism can conform more closely to the diameter of the shank of the pin than would be the case if the pin carried a head or shoulder at its rear end; accordingly the pin can be more accurately guided by the guiding channel, as it is being driven. Although it is not necessary that the rear end of the pin shall penetrate the ticket or article, the rear end may be pointed to allow it to be more closely crimped against a portion of the ticket.

In its preferred forms in which one end of the pin is crimped against the ticket, the invention is also concerned wtih crimping the other end of the pin into the shape of an S with the effect of preventing the said one end of the pin from rotating away from the surface of the ticket.

Other objects and advantages of the invention will be apparent from this specification and its accompanying drawings in which the invention is explained by the showing of preferred embodiments thereof.

Figure 17:
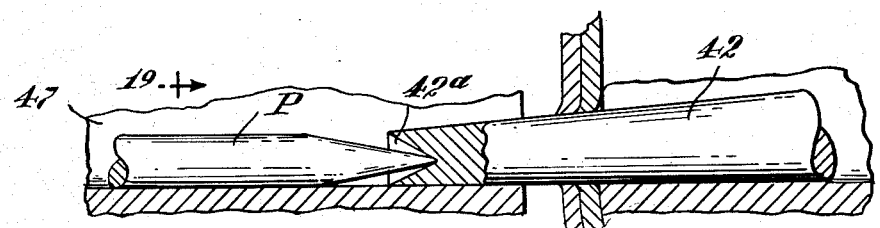
Figure 18:
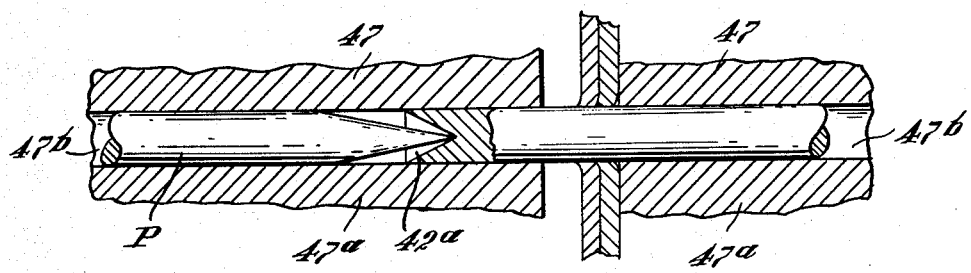
Figure 19:
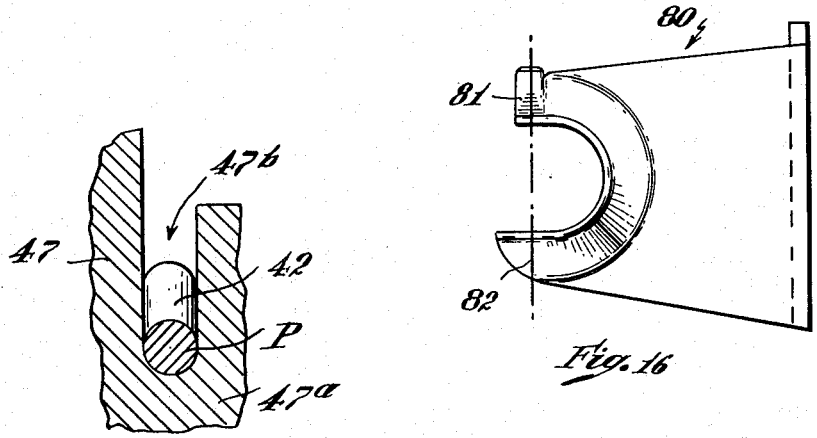
Figure 16:
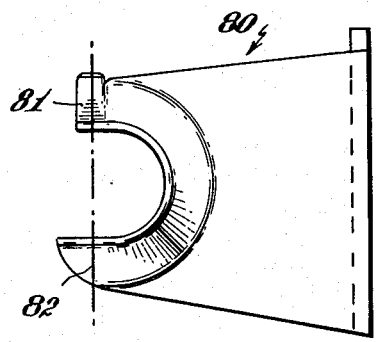
Figure 20:
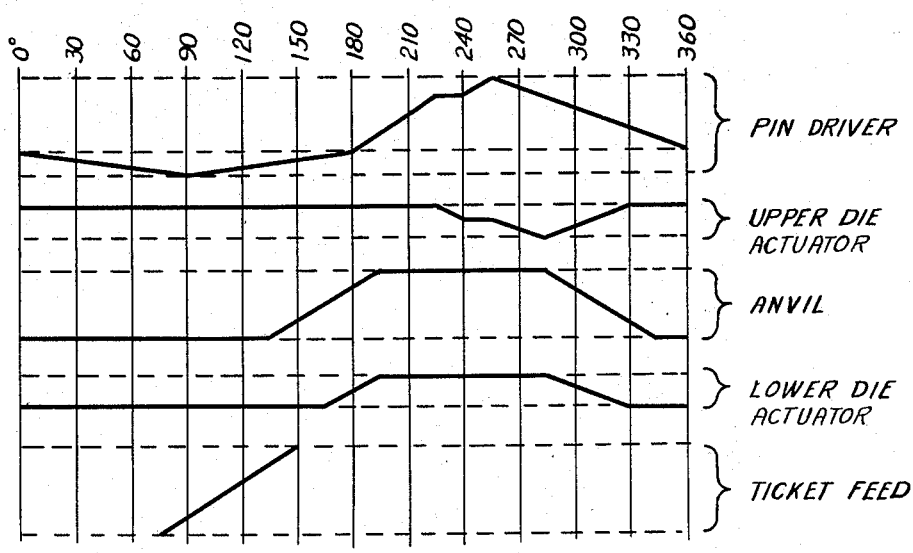
Figure 21:
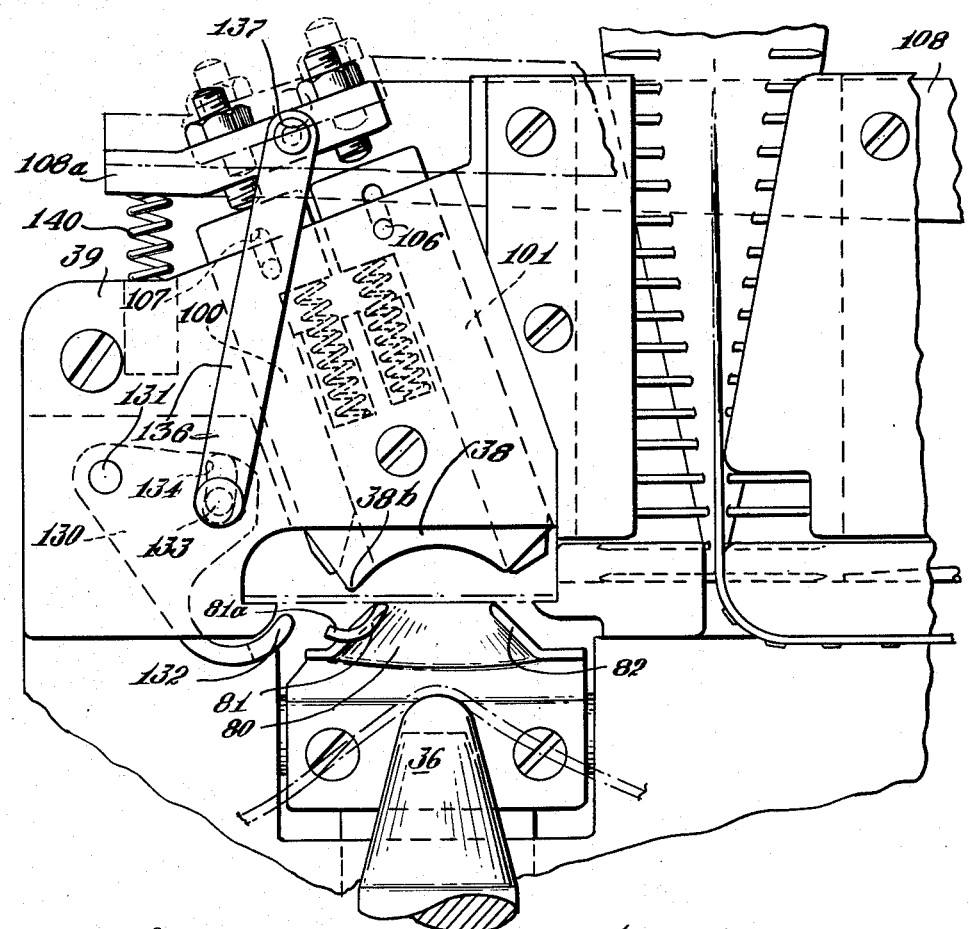
Figure 22:
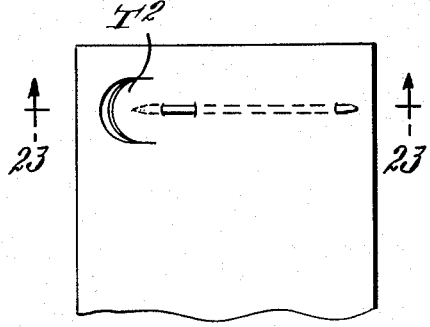
Figure 23:
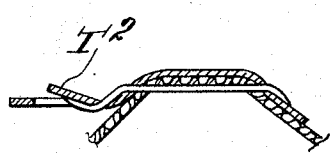

Figs. 10 to 15 inclusive are fragmentary front elevations showing successive stages in the pinning of the ticket;

Fig. 16 is a detail view of the lower die member, in plan;

Fig. 17 is a vertical sectional view taken through the pin guiding channel and pin driver;

Fig. 18 is a detail, partly in plan and partly in horizontal section, showing the pin guiding channel and pin driver;

Fig. 19 is a vertical sectional view taken on the line 19—19 of Fig. 17;

Fig. 20 is a timing diagram particularly applicable to the several cams of the machine of the preceding figures;

Fig. 21 is a front elevation showing portions of a modified form of the machine;

Fig. 22 is a plan view showing another form of ticket and its pin;

Fig. 23 is a sectional view taken on the line 23—23 of Fig. 22, showing also the fabric article to which the pin is attached;

Figs. 24 to 28 inclusive are fragmentary front elevations showing successive stages, subsequent to the stage of Fig. 21, in pinning the ticket of Figs. 22 and 23.

Figure 29:
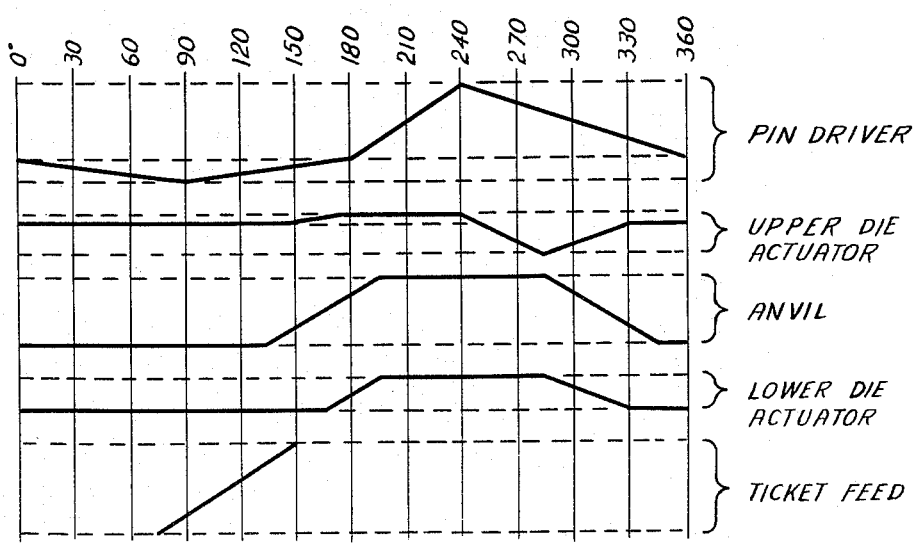
Figure 30:
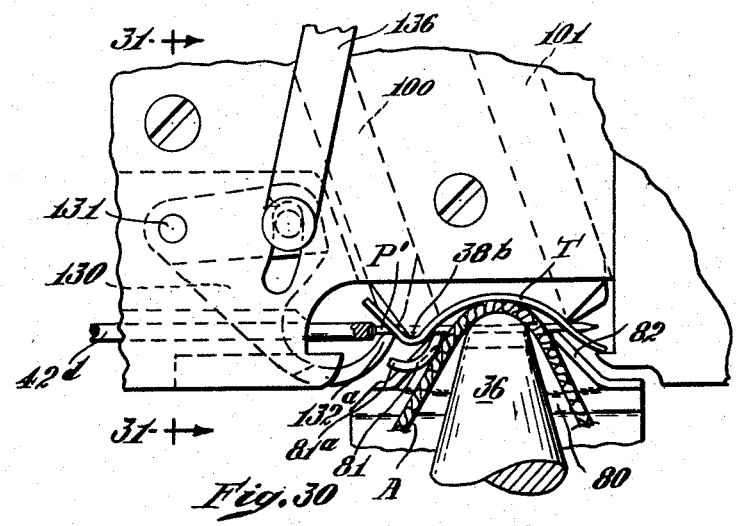
Figures 31, 32:
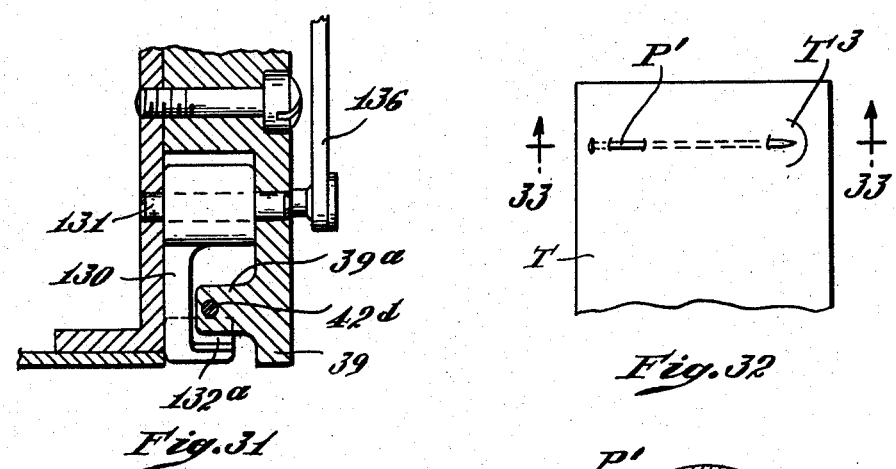

Fig. 29 is a timing diagram particularly applicable to the several cams of the machine of Fig. 21;

Fig. 30 is a fragmentary front elevation of a further modified form of the machine;

Fig. 31 is a vertical sectional view taken on the line 31—31 of Fig. 30;

Fig. 32 is a plan view showing a ticket pinned by the machine of Fig. 30; and

Figure 33:
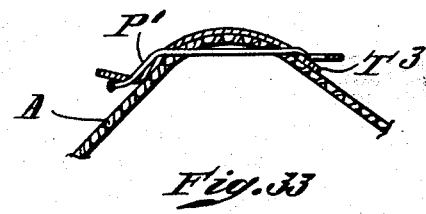

Fig. 33 is a sectional view taken on the line 33—33 of Fig. 32, showing also the fabric article to which the pin is attached.

Pinning apparatus of this invention may be constructed as a machine which merely pins tickets onto articles, or may be constructed as a part of a machine which also forms and marks the tickets. In this specification and drawings the invention is illustrated as applied to a machine such as disclosed in my United States Patent 2,083,150.

Figure 1:
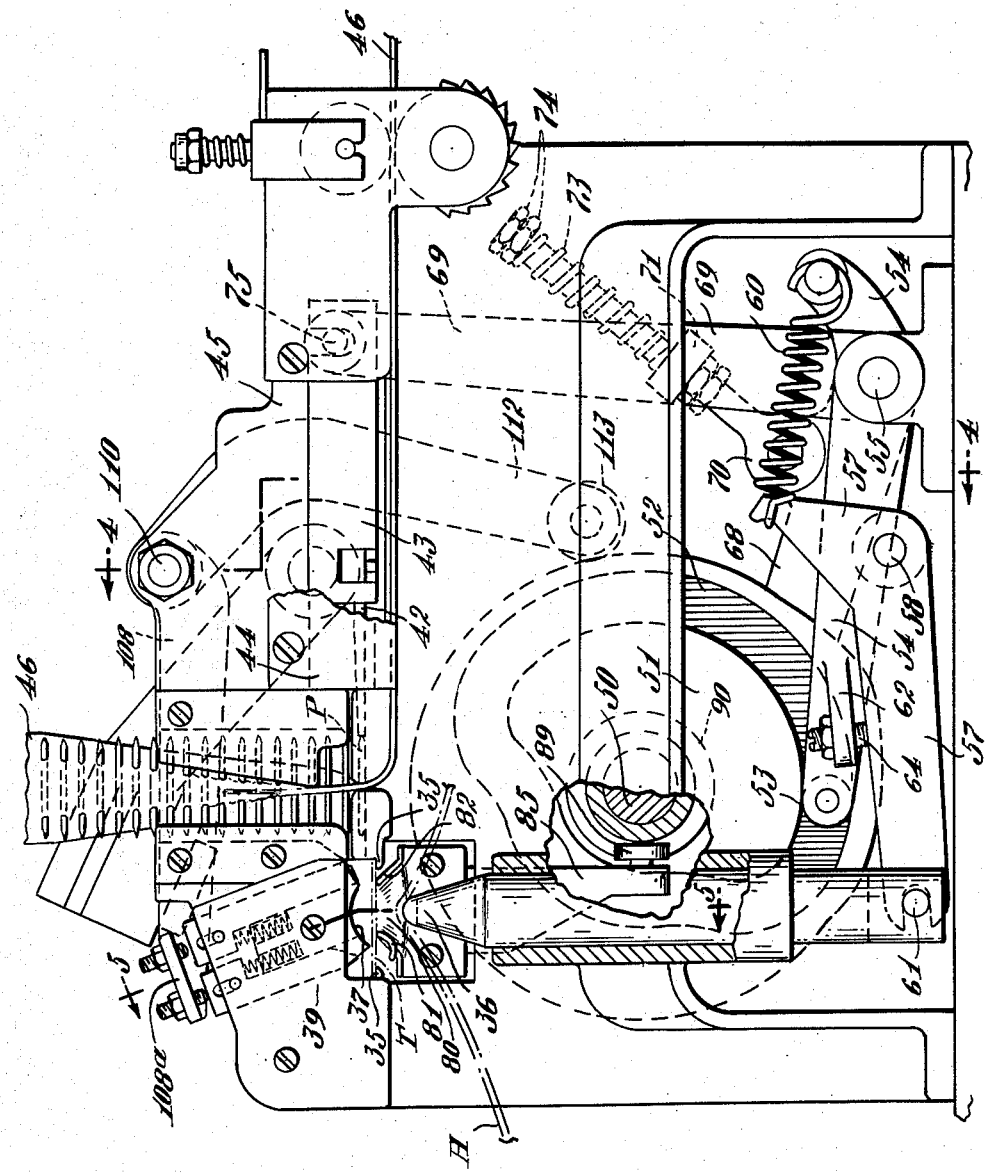
Fig. 1 is a front elevation of a pinning machine embodying the present invention, with the front wall of its housing removed and with certain parts broken away.
Figure 3:
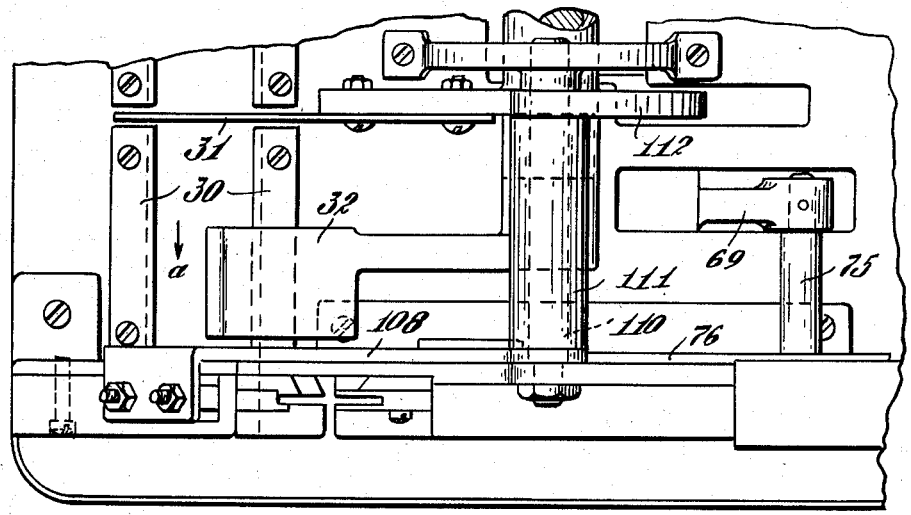
Fig. 3 is a plan view of a portion of the machine of Fig. 1.
Figure 10:
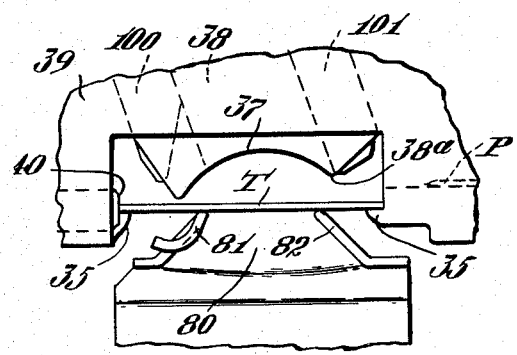

Referring to the plan view of Fig. 3, guides 30 form a path along which a ticket is fed step by step, by feed mechanism such as disclosed in said patent, past a cutter 31 and a printing head 32, toward the front of the machine (in the direction of the arrow "a") until the ticket lies as shown at T in Fig. 1 upon ledges 35—35 above the tip of an anvil 36 and beneath a downwardly concave ticket abutment surface 37 of a block 38, Fig. 10, which is contained largely within an upper frame member 39. The ticket is yieldingly urged to the right in Fig. 10 by a spring-pressed member 40 which engages its left edge.

Figure 11:
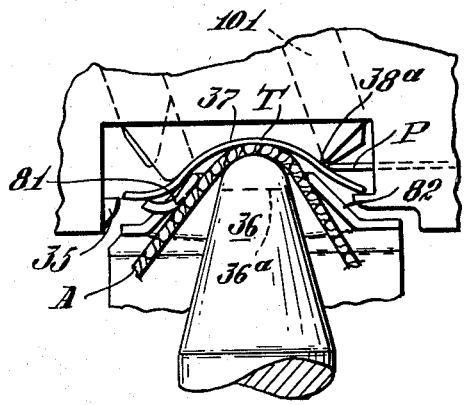

The anvil 36 rises carrying with it an article A, such as a fabric, which has been placed on the anvil by the operator, and forces the article and ticket upwardly until the ticket seats against the abutment surface 37 and the ticket and article are held together in bent condition as in Fig. 11 for the reception of a pin.

A pin-driver 42 (Fig. 1) is carried by a slide 43 which reciprocates in a slot in a guide plate 44 having a back plate 45, pin-driver 42 being in position to drive a pin P through the bent ticket and article. The pins may be fed in any desired manner to the pin channel in advance of the pin-driver 42. As shown, the machine receives the pins from a paper strip 46 which is progressively folded upon itself as it advances the pins step by step into the pin channel in the path of the pin-driver, so that, as in the machine of said Patent No. 2,083,150, the pin-driver pushes the pins out of the strip.

Although the present invention is applicable to pinning with conventional headed pins, preferred embodiments are shown as operating with headless pins having points at both ends. Referring to Fig. 18, strip guiding plates 47, 47 have ledges or shoulders 47ª, 47ª having aligned grooves 47ᵇ, 47ᵇ constituting a pin channel which receives a pin from the strip 46 and through which the pin-driver 42 operates. However unlike the pin grooves which form the pin channel in said patent, these grooves 47ᵇ, 47ᵇ can conform closely to the diameter of the shank of the headless pin, both as to width of the groove (Fig. 18) and as to diameter of the semi-circular bottom of the groove (Fig. 19). Moreover the major portion of the shank of the headless pin need not clear the bottom of the pin channel, contrary to the situation when a head must also pass through the channel, and the shank can slide along in contact with the bottom of the channel as in Fig. 17.

With the truly headless pin, the pin-driver 42 can be formed to operate in such grooves 47ᵇ, 47ᵇ that are so narrow as merely to accommodate the diameter of the shank of the pin. In the preferred construction of the pin driver, its leading end is circular, substantially conforming to the diameter of the pin shank, width of the groove and diameter of the semi-circular bottom of the groove 47ᵇ, and at such leading end is countersunk to provide a conical recess 42ª for receiving the rear end of the pin. As shown in Fig. 17 the point of the pin seats in the conical recess and the shank of the pin seats on the bottom of the pin channel groove. The point of the pin is confined at the very base of this conical recess 42ª and thereby prevented from being bent into a barb by the force applied to it by the pin driver. Rearwardly of its driving end, the pin-driver still conforms substantially to the bottom of the channel and seats thereon, and is rounded at its top, but progressively increases in height, its lateral width substantially conforming to the lateral width of the channel as is evident from Figs. 18 and 19.

As a result of the pin guiding and driving mechanism thus adapted for headless pins, the pin is guided with precision as it approaches the waiting ticket.

The machine, as in said patent, is provided with a main cam shaft herein shown at 50 carrying a series of cams for actuating the various elements of the machine, such cam shaft rotating through one revolution under the control of a one revolution clutch, for each cycle. In explaining the present invention it is necessary to refer to only one of the series of cams on the cam shaft of said patent, namely a double face cam (indicated by the numeral thirty-seven in said patent) having a groove on its front face for operating the anvil and another groove on its rear face for operating the pin-driving mechanism. The corresponding double face cam of the present machine is indicated at 51 in Fig. 1. The front face of double face cam 51 has a groove 52 in which rides a follower 53 carried on a bell crank 54 mounted on a pivot pin 55. Another bell crank 57 is mounted to pivot at 58 on the longer arm of bell crank 54 and the shorter arms of the two bell cranks 54 and 57 are connected by a retracting spring 60. The longer arm of bell crank 57 is slotted to receive a pin 61 connecting it to the anvil 36. Unlike the anvil of said patent, the anvil 36 of the present machine is shown as comprising a single vertically movable member. A lug 62 on bell crank 54 carries an adjusting screw 64 by which the bell crank 57 may be adjusted relative to the bell crank 54. As the cam 51 rotates, the anvil 36 is raised from the position of Figs. 1 and 10 to a position such as shown in Fig. 11 which depends upon the thickness of the article. In the present machine the spring 60 is sufficiently yieldable to permit considerable variation in the thickness of the article.

Figure 2:
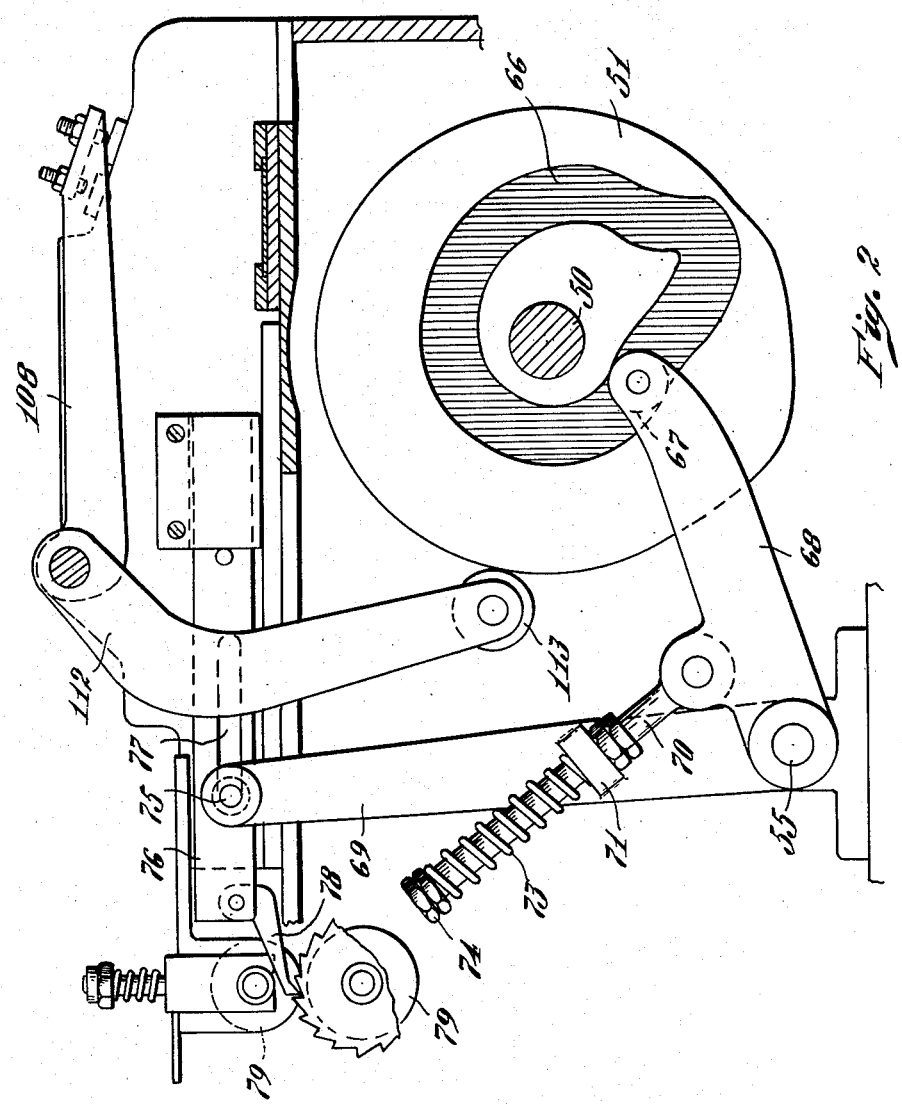
Fig. 2 is a view taken from the point of view opposite to that of Fig. 1, partly in vertical section and partly in elevation, numerous parts being omitted.

As shown in Fig. 2, a cam groove 66 on the rear face of double face cam 51 operates a follower 67 carried by a lever 68, Figs. 1 and 2, which pivots on pin 55. Another lever 69 is also pivotally mounted on pin 55, and levers 68 and 69 are connected by a yieldable connection comprising an eye or swing bolt 70 pivoted on lever 68, a lug 71 carried by lever 69 and through which the bolt 70 passes loosely, and a compression spring 73 which seats against the lug 71 and is held under compression by lock nuts 74.

At its upper end, lever 69 carries a pin 75 which extends into a slot in the pin-driver slide 43, Fig. 1.

The double face cam 51, like the corresponding double face cam of said patent serves to raise and lower the anvil and reciprocate the pin-driver in proper timed relation. The mechanism for operating the pin-driver may also, as in said patent, drive feed rolls for advancing the pin strip. Thus as in Fig. 2 a slide bar 76 loosely mounted on the rear face of back plate 45 and having a slot 77 through which pin 75 loosely extends carries a pawl 78 for operating the lower of the cooperating strip feed rolls 79.

The pin bender mechanism of the present machine comprises in its preferred form upper die members that move down and engage the shank of the pin to bend the pin against the ticket, and a cooperating lower die members having die portions which support the pin and about which the upper die members bend the pin. The lower die member, indicated generally at 80, is open-ended and forked as viewed in plan, Fig. 16, and lies mainly behind the vertical axis of the anvil 36, Fig. 1, but with its two branches each extending a short distance forwardly of this vertical axis on opposite sides of the anvil. The open end of the die member affords a space through which the tip of the anvil 36 can move to raise the fabric article and hold the article and ticket against the abutment surface 37.

The die member 80 can conveniently be formed by a stamping operation in which those portions surrounding the open end are struck upwardly into generally conical shape. In Fig. 16 the broken line indicates the axis of the pin as it lies over the lower die member. It will be understood that the lower die member can function as a die at each of its two branches which underlie the pin. These two portions of the lower die member will for convenience be referred to as the lower left and right die portions, and are designated by the reference characters 81 and 82 respectively, as for example in Figs. 1 and 10.

Figure 4:
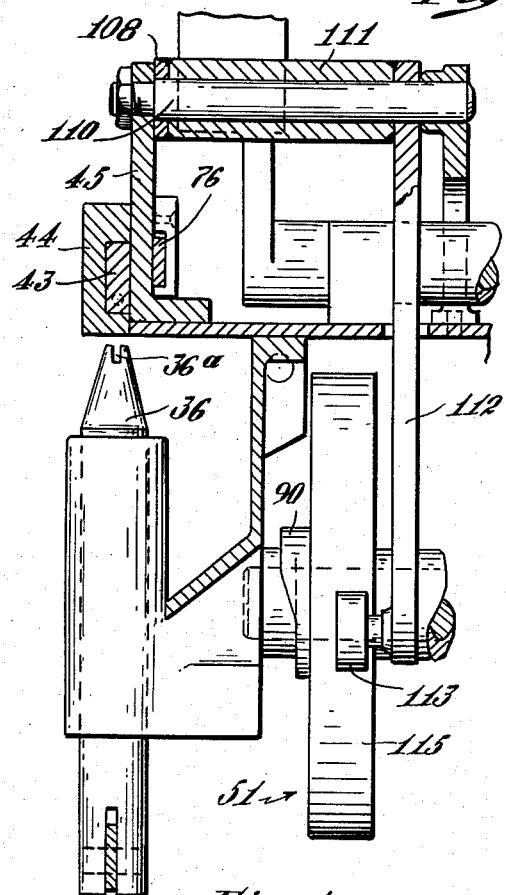
Fig. 4 is a sectional view taken on the line 4—4 of Fig. 1.
Figure 5:
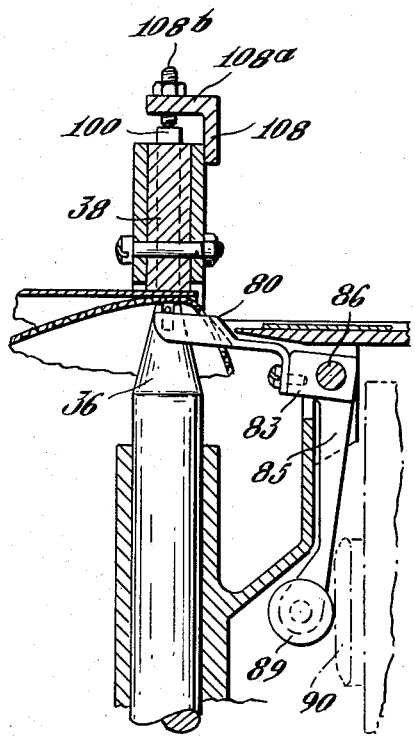
Fig. 5 is a fragmentary view of certain parts of the machine, partly in right side elevation and partly in cross-section, the section being taken along the line 5—5 of Fig. 1.

The lower die member is shown as extending to the left in Fig. 5, from the squared hub portion 83 of an actuating lever 85 which is pivotally mounted at 86. In their inactive positions the lower die portions 81 and 82 are located with their tops at the level of the bottom or article side of the ticket T as the ticket enters, and these die portions and the remainder of the lower die member are sufficiently removed from the anvil to permit easy insertion of the article between the die member and the anvil. The lower die member is raised and lowered in timed relation to the operation of the pin-driver by engagement of a follower roll 89 on actuating lever 85 with an additional cam 90 formed on the front face of double-face cam 51, as shown in Figs. 1, 4 and 5.

At least before the pin reaches the left-hand lower die portion 81 the lower die member is raised to the level shown in Fig. 11, at which the tops of die portions 81 and 82 are adapted to guide and support the shank of the pin. The left-hand lower die portion 81 is particularly effective as a guide in that it prevents the entering pin from being deflected downwardly when the leading point of the pin engages the lower surface of the ticket after having twice penetrated the fabric article.

The lower die portions 81, 82 preferably establish a level of support for the pin independently of the anvil, and for this purpose the slot 36ª through which the pin passes through the head of the anvil is sufficiently deep so that the pin does not seat in this slot. The level of support of the pin by the lower die portions is thus independent of the exact level attained by the top of the anvil, i.e. is independent of the thickness of the article being pinned.

Figure 6:
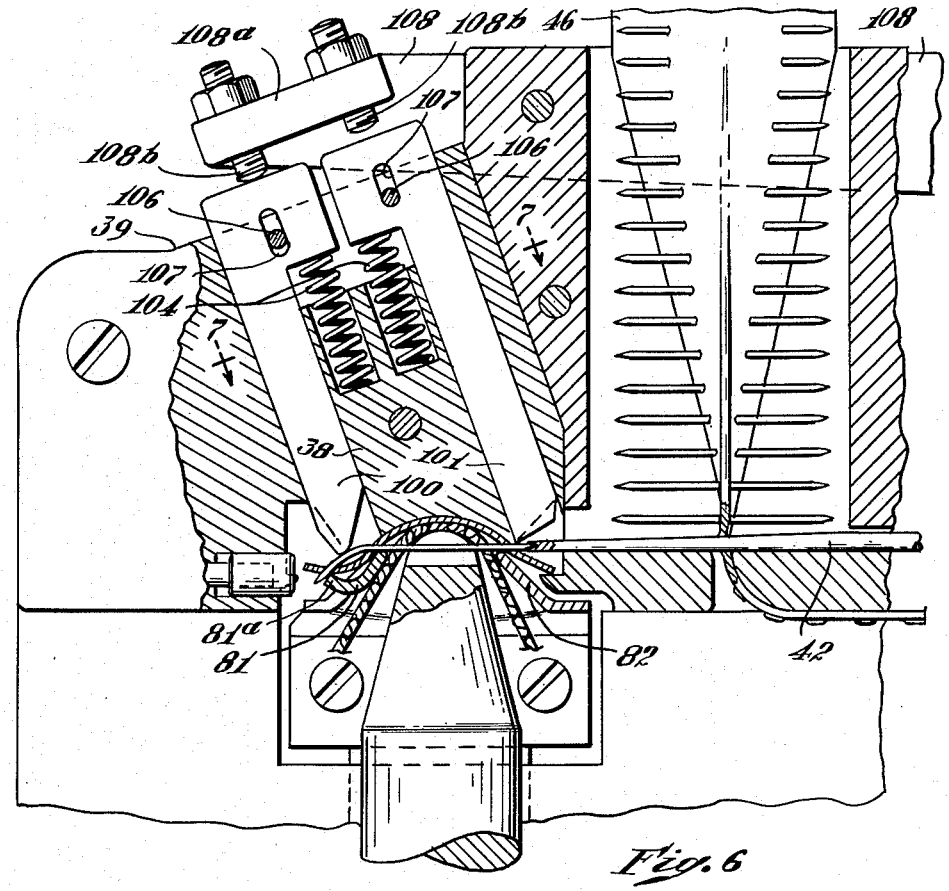
Fig. 6 is a fragmentary view largely in vertical section through the path of insertion of the pin.
Figure 7:
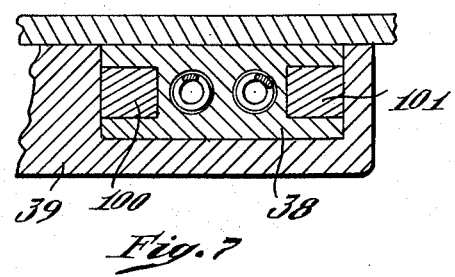
Fig. 7 is a sectional view taken on the line 7—7 of Fig. 6.

The abutment block 38, shown in Figs. 6 and 7, is slotted to receive two slidable upper die members 100, 101, preferably inclined somewhat from the vertical. Compression springs 104 seated in bores in the abutment block 38 urge the die members 100, 101 upwardly in their slots. Fixed pins 106 are adapted to engage the bottoms of slots 107 in the respective die members 100 and 101 to limit their upward movement.

Mechanism for actuating the upper die members includes a pivoted arm 108 having a flange 108ª which overlies the die members and acts thereon through adjustable screws 108ᵇ (Figs. 5 and 6). The right end of arm 108 is pivoted on shaft 110 (Figs. 1 and 3) and is rigidly connected by a sleeve 111 to a depending curved arm 112 carrying at its bottom a cam follower roll 113. Cam follower roll 113 is operated by an additional cam surface 115 formed upon the rim of the double-faced cam 51 previously described. Thus the upper die members are operated in timed relation to the operation of the pin-driver, operation of the anvil, and operation of the lower die members.

The cooperation of the elements of the machine in the pinning operation can best be seen from the successive views of Figs. 10 to 15, supplemented by the timing diagram of Fig. 20. The pin-driver first makes a short but relatively slow backward movement which is utilized to advance the pin strip by means of the feed wheels 79, 79, Fig. 2, to deliver a pin into the pin channel in advance of the pin driver. The ticket feeding mechanism delivers a ticket above the anvil. The anvil and the lower die member rise, reaching their elevated positions such as shown in Fig. 11 at approximately the same time and before the pin-driver advances a pin into the pinning zone. In this position the ticket and article are held in bent condition for reception of the pin. The lower die portions 81 and 82 are in position to guide and support the shank of the pin, but not to be struck by the point of the advancing pin. The upper die members 100 and 101 are likewise not in position to be struck by the point of the advancing pin. Upper die member 101 however is in position to guide the shank of the pin.

Figure 12:
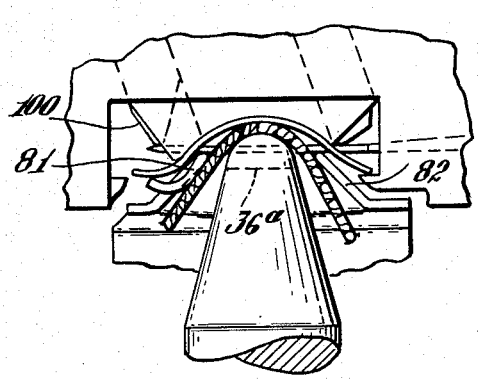

In Fig. 11 the pin P is being moved to the left by the pin-driver, and its point is passing by the lower end of upper die member 101. Either the lower end of die member 101 or a beak 38ª of the abutment block 38, or both, may guide the shank of the pin. Following this, the pin continues to the left, penetrates the ticket, passes over the upper surface of lower die portion 82, then penetrates the article A, passes through the slot 36ª of the anvil, penetrates the article a second time, is guided by the left-hand lower die portion 81, and penetrates the ticket a second time. The point of the pin passes the nose of the upper left die member 100, as shown in Fig. 12, without the point itself striking the die member. At approximately the two hundred twenty-five degree stage of the cycle as shown in the timing diagram of Fig. 20 the pin driver pauses with the pin in the position of Fig. 12 and the upper die members now move down slightly with the left upper die member 100 engaging the shank of the pin slightly to the rear of the point itself of the pin, bending the shank of the pin transversely of the surface of the ticket so that the point of the pin is directed toward the ticket as in Fig. 13. In this bending of the shank the left lower die portion 81 supports the shank of the pin between the die member 100 and the article, so that the die member 100 does not bend that portion of the shank which engages the article. The extent of bending performed by the die member 100 is also independent of the thickness of the article and the position assumed by the anvil because the position of the pin is not affected by the thickness of the article and the level reached by the head of the anvil.

Figure 13:
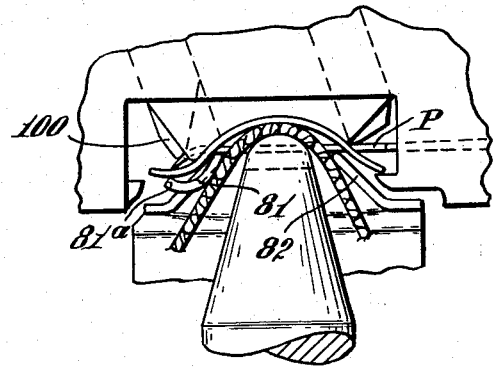

The condition shown in Fig. 13 is reached at approximately the two hundred forty degree stage of the cycle. At this stage the upper die actuating mechanism pauses and the pin-driver resumes its forward stroke.

Figure 14:
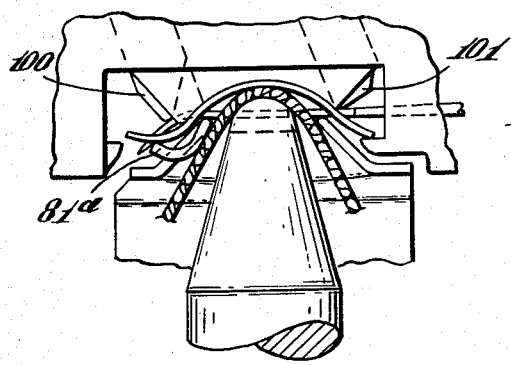

Fig. 14, as well as Fig. 6, shows the pin-driver as having completed its stroke and the pin as having penetrated the ticket a final time. During this final penetration, which is completed at approximately the two hundred fifty-five degree stage, the die member 100 functions as a stationary guide for the shank of the pin.

The left lower die portion 81 is preferably formed to cooperate in the forming of an S-bend in the pin. For this purpose this die portion is provided with a turned-up left edge portion 81ª so that this die member has the cross-sectional shape of a shallow U with legs of unequal length. This left edge portion 81ª is in position to engage the shank of the pin on the article side of the ticket as shown in Fig. 14. The upper die member 100 moves down from the position of Fig. 14 to the fully closed position of Fig. 15 and forces the shank and ticket into the U defined by the lower die member. The turned-up edge portion 81ª acting on the shank near the point, forces this end of the pin against the lower or article side of the ticket. The left end of the pin is thus formed into the S-shape of Figs. 15 and 9, securely crimped against the ticket and strongly resistant to axial rotation or endwise movement of the pin.

In this crimping operation neither upper die member nor the cooperating lower die member bears against the point itself of the pin. Thus the upper die member 100 does not deflect the pin by being struck by the point itself of the pin, but rather deflects the pin by moving down in engagement with the shank somewhat in the rear of the point itself. Likewise the lower die member is shaped and positioned to avoid being struck by the point itself of the pin. Thus the formation of a hook or barb at the point of the pin is avoided.

Figure 15:
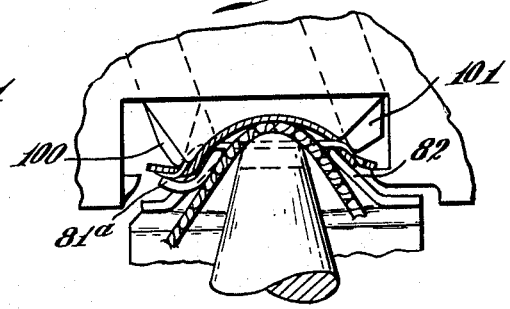

Considering now the trailing or right end of the pin, this is crimped by a downward movement of the right upper die member 101 which accompanies the final downward movement of the left upper die member. Until this stage the right upper die member has not been forced down, because of non-engagement with the corresponding adjusting screw 108ᵇ, Fig. 6. A comparison of Figs. 14 and 15 shows that in the final closure of the die members the right upper die member 101 engages the shank of the pin at its trailing end and forces this and the underlying portion of the ticket against the right lower die portion 82, the die member 101 approaching the pointed trailing end of the pin. The action of the upper die member 101 against the shank of the pin may be described as a wiping action which preferably avoids the point itself of the pin. However, if the die member 101 should pass over the point itself no objectionable barb or hook would be likely to result because of the direction by which the die member approaches the point and the underlying support afforded by the ticket and right lower die portion 82.

The right lower die portion 82 like the left lower die portion 81, by supporting the shank between adjacent places of penetration of the ticket and article, prevents the portion of the shank which engages the article from being bent by the cooperating upper die member. Thus stretching of the fabric of the article is avoided.

Following the position of Fig. 15, which corresponds to approximately the two hundred eighty-five degree stage of the cycle, the anvil and upper and lower die members return to their inactive positions of Fig. 10 and the operator removes the article and attached ticket.

Figure 8:
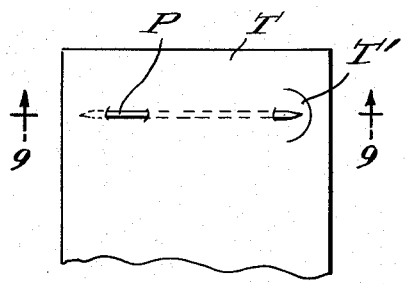
Fig. 8 is a plan view showing the ticket and pin.
Figure 9:
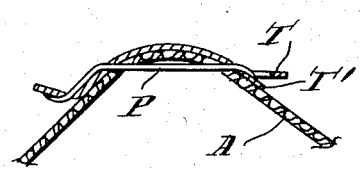
Fig. 9 is a sectional view taken on the line 9—9 of Fig. 8, showing also the fabric article to which the ticket is attached.

In the ticket shown in Figs. 15, 8 and 9, that portion of the ticket against which the right or trailing end of the pin is bent comprises a bendable tab T' similar to a construction disclosed in my copending application for Pin Tickets, Serial No. 572,051, filed on the same date as this present application. This tab serves the purpose of assisting in guarding the point against accidental contact with articles or persons handling the articles and also of insuring that the point remains closely against the tab, notwithstanding flexing of the body of the ticket in handling.

It will be apparent that the upper die members are independently removable. For pinning without crimping the trailing ends of the pins, for instance with headed pins, the right upper die member 101 may be omitted.

The modified of machine of Figs. 21 and 24 to 29 inclusive is especially adapted for pinning tickets of easily bendable material or tickets wherein the portion against which the leading end of the pin is crimped comprises a tab or easily bendable portion as disclosed in my said copending application. In either of these cases the pin can advantageously be fully inserted in a straight path, i.e. without having its shank bent during the course of insertion. The modified form of machine of these figures thus differs from the first described embodiment principally in the provision of a means for bending a portion of the ticket sufficiently to receive its final penetration by the pin while the pin is still straight, and by effecting this final penetration before the bending action of the left upper die member takes place. The manner in which the pin is supported and guided by the lower die portions, and the form into which its two ends are shaped by the cooperative action of upper and lower die members is substantially the same in both embodiments.

In the explanation and illustration of the modified form numerous elements which correspond to or are similar to elements of the first described embodiments are designated by the same reference characters, and not further described except in certain cases.

Figure 24:
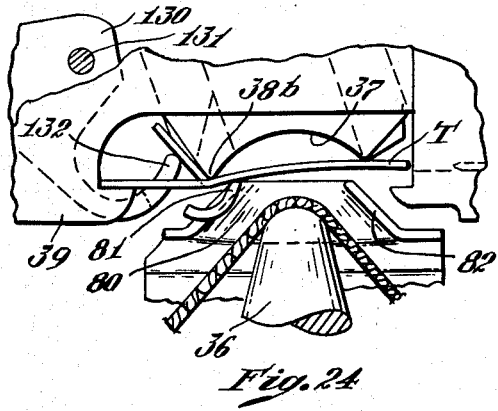

Referring to Figs. 21 and 24, the mechanism for bending a portion of the ticket, which portion may be a tab, is shown as including a lever 130 pivoted at 131 within a recess in the head frame portion 39. Lever 130 has a hooked finger portion 132 which in its inactive position lies below the level of the ticket feed in Fig. 21. A pin 133 movable in a slot 134 in the head frame portion 39 connects the lever 130 to a link 136 which is pivotally connected at 137 to the flange 108ᵃ of lever 108 of the actuating mechanism for the upper die members.

Upward swinging of the lever 130 causes its hooked finger portion 132 to engage a portion of the ticket on the lower or article side thereof and bend this portion around a nose 38ᵇ of the abutment block 38. In this modified form of machine the cam surface 115 for operating the upper die members (now in this modified form operating also the ticket-bending finger 132) is shaped so as to allow the upper die actuator lever 108 and flange 108ᵃ to rise under the influence of a suitable spring 140 before the anvil and lower die member are fully raised so that the finger 132 accordingly rises to the position of Fig. 24. As shown in timing diagram of Fig. 29 this movement begins at approximately the one hundred and fifty degree stage of the cycle; the finger 132 remains raised until the pin has been fully driven. The pin and slot connections 106, 107 retain the upper die members in position for them to guide the shank of the pin as the pin point enters the left portion of the ticket held up by the finger 132. The upper left die member 100 is particularly effective in preventing the forward end of the pin from being deflected upwardly as its point encounters the tag material that has been turned up by the finger 132. Fig. 24 shows the upper left die member 100 and the finger 132 in these positions where they remain during the insertion of the pin. It may be mentioned here that as in the first described embodiment, the die members do not deflect the pin by striking the point itself of the pin.

Figs. 25 to 28 show successive further stages in the operation of the modified form of machine.

Figure 25:
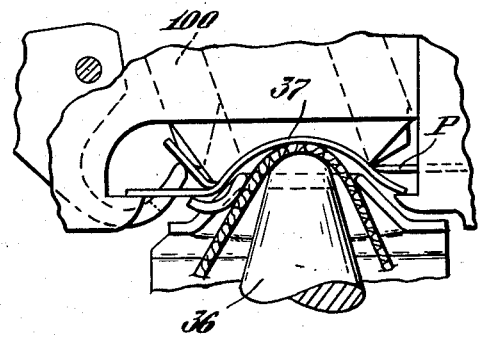

Fig. 25 shows the lower die portions as having risen to a level to support and guide the shank of the pin, the anvil as having risen to clamp the article and ticket against the abutment surface 37, and the point of the pin as about to penetrate the ticket for the first time.

Figure 26:
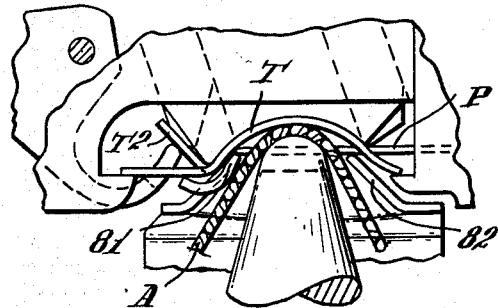

Fig. 26 shows the pin as having penetrated the ticket once and the article twice, and as about to penetrate the ticket a second time, the lower die portions guiding the shank of the pin as in the first described embodiment.

Figure 27:
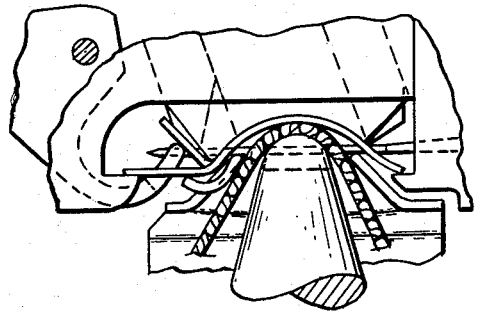

Fig. 27 shows the pin as completely inserted and still straight.

Figure 28:
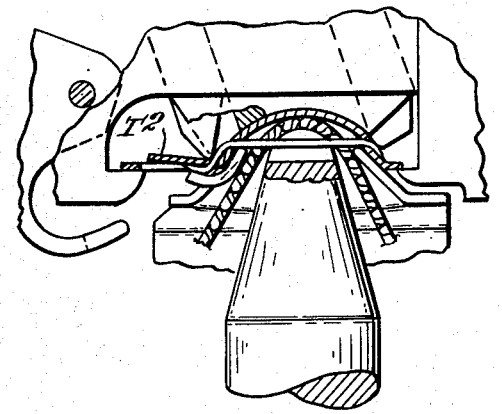

Fig. 28 shows the die members in their final closed positions, having crimped the two ends of the pin in substantially the same shape as in the first described embodiment.

Referring to the timing diagram of Fig. 29, it will be seen that the pin-driver does not pause when the pin is partly driven as in the diagram of Fig. 20 but completes the driving of the pin at approximately the two hundred forty degree stage, that the bending of the pin is deferred until the pin has been completely driven, and that the bending takes place during one continuous movement of the upper die actuating mechanism.

In tickets pinned by this modified form of the machine, the portion of the ticket against which the leading end of the pin is crimped may be a tab T², as shown in Figs. 22 and 23, similar to a construction disclosed in my said copending application; if, however, the ticket material is easily flexed such tab is not needed.

The modified form of machine of Figs. 30 and 31 is generally similar to that of Figs. 21 and 24 to 28. However in the machine of Figs. 30 and 31 the end of the pin which is crimped in the form of an S-bend and which terminates in contact with the lower or article side of the ticket constitutes the trailing end rather than the leading end of the pin. This is accomplished with pin bending and ticket bending mechanisms similar to those of Figs. 21 and 24 to 28 by reversing the direction in which the pin is driven.

In Figs. 30 and 31 the upper frame member 39 is shown as provided with a boss or enlargement 39ᵃ having a pin channel in which a pin-driver 42ᵈ operates to drive a pin from left to right in Fig. 30. Although a pin-driver such as described in connection with Figs. 17 to 19 for headless pins could be employed, the pin-driver 42ᵈ is here shown as arranged to drive a conventional headed pin P'.

In Figs. 30 and 31 the finger 132ª carried by lever 130 bends the material of the ticket upwardly around the nose 38ᵇ similarly to the action of the finger 132 of Fig. 24 but is so shaped and proportioned that when it is in the raised position of Fig. 30 it presents an upper surface which supports and guides the shank of the entering pin. The entering pin is thereby prevented from being deflected downwardly when its point encounters the turned-up left portion of the ticket. In the device of Fig. 30 the lower right die portion 82 functions similarly to the lower left die portion 81 of the preceding figures to prevent the pin from being deflected downwardly when it encounters the lower surface of the ticket.

The cooperating upper and lower die members function in the same manner as in the device of Figs. 21 and 24 to 28 to crimp both ends of the pin. Thus after insertion of the pin as in Fig. 30, the upper die members move down, similarly to Fig. 28, and crimp the pin in conjunction with the lower die portions.

Figs. 32 and 33 show the pinned ticket. It will be observed that the point at the leading end of the pin has been forced against a tab T³ and that the headed trailing end of the pin has been forced against the lower or article side of the ticket.

From the foregoing description of three forms of the invention, numerous features common to each will be noted. For example; each permits the crimping of a pointed end of a pin against the ticket material without bending the point itself; each provides for crimping a pointed end of a pin against the ticket material and for anchoring the pin to the ticket at the opposite end of the pin to prevent rotary and longitudinal movement relative to the ticket so that the point will stay in place against the ticket and the pin will not loosen; and each provides for prevention of bending of these portions of the pin shank that engage the fabric article.

I claim:

1. A machine for pinning a ticket to a flexible article, the machine comprising means for holding the article and ticket in bent condition for each to be penetrated twice by a pin driven in an approximately straight line, means for inserting a pin through the ticket and article along such approximately straight line, causing the pin to penetrate both the ticket and the article twice, and means for crimping a pointed end of the pin, said crimping means comprising opposed dies relatively movable between open and closed positions to bend a shank portion of the pin transversely of the surface of the ticket to a position displaced in the direction of the article side of the pinned ticket and article, relative to the portion of the pin lying between the penetrations of the article without bearing against the point itself of the pin.

2. A machine for pinning a ticket to a flexible article, the machine comprising means for inserting a pin through the ticket and article and means for crimping a pointed end of the pin, said crimping means comprising opposed dies relatively movable between open and closed positions to bend the shank of the pin transversely of the surface of the ticket without bearing against the point itself of the pin, one of said dies being located to bear against the shank of the pin at a place which lies between adjacent places where the pin penetrates the article and ticket, and the other die being located to bear against the shank of the pin nearer to the point thereof.

3. A machine for pinning a ticket to a flexible article, the machine comprising means for inserting a pin through the ticket and article and means for crimping a pointed end of the pin, said crimping means comprising opposed dies relatively movable between open and closed positions to bend the shank of the pin transversely of the surface of the ticket without bearing against the point itself of the pin, one of said dies acting on spaced portions of the shank on the article side of the ticket and the other of said dies acting on a portion of the shank on the exposed side of the ticket between said spaced portions of the shank.

4. A machine for pinning a ticket to a flexible article, the machine comprising means for inserting a pin through the ticket and article from the exposed side of the ticket toward the article side thereof and means for crimping the end of the pin that has penetrated the ticket and article, said crimping means comprising opposed dies relatively movable between open and closed positions to bend the shank of the pin transversely of the surface of the ticket without bearing against the point itself of the pin, one of said dies being located on the exposed side of the ticket in position to guide the pin by bearing against the shank of the pin as the point of the pin penetrates the ticket from the exposed side toward the article side thereof.

5. A machine for pinning a ticket to a flexible article, the machine comprising means for inserting a pin through the ticket and article including penetration of the ticket from the article side toward the exposed side thereof and means for crimping the end of the pin that has penetrated the ticket and article, said crimping means comprising opposed dies relatively movable between open and closed positions to bend the shank of the pin transversely of the surface of the ticket without bearing against the point itself of the pin, one of said dies being located on the article side of the ticket in position to guide the pin by bearing against the shank of the pin as the point of the pin penetrates the ticket from the article side toward the exposed side thereof.

6. A machine for pinning a ticket to a flexible article, the machine comprising means for driving a pin through the ticket and article and means for crimping the end of the pin that has penetrated the ticket and article, said crimping means comprising opposed dies relatively movable between open and closed positions to bend the shank of the pin transversely of the surface of the ticket without bearing against the point itself of the pin, said dies being located on opposite sides of the ticket each in position to guide the pin by bearing against the shank of the pin during driving of the pin.

7. A machine for pinning a ticket to a flexible article, the machine comprising means for holding the article and ticket in bent condition for each to be penetrated twice by a pin driven in an approximately straight line, means for inserting a pin through the ticket and article and means for crimping the end of the pin that has penetrated the ticket and article, said crimping means comprising opposed die members relatively movable between open and closed positions, said die members in open position affording a path for entry of the leading end of the pin such that neither die member bends the point itself of the entering pin, and said die members in closed position defining a bend in the pin transverse to the surface of the ticket.

8. A machine for pinning a ticket to a flexible article, the machine comprising means for inserting a pin through the ticket and article and means for crimping the end of the pin that has penetrated the ticket and article, said crimping means comprising opposed die members relatively movable between open and closed positions, said die members in open position affording a path for entry of the leading end of the pin such that neither die member bends the point itself of the entering pin, and said die members in closed position defining an S-bend in the pin transverse to the surface of the ticket.

9. A machine for pinning a ticket to a flexible article, including pin-driving means, means for holding the ticket and article together in bent condition to be penetrated by the pin, and a member engageable with the shank of the pin between adjacent places of penetration by the pin of the ticket and article.

10. In a machine for pinning a ticket to a flexible article in which the article and ticket are held by an anvil while being penetrated by a pin, the combination of a pin-bender acting on a portion of the pin on the exposed side of the ticket to bend the pin in the direction of the article, and a supporting member engageable with the shank of the pin between the ticket and the article at a place between the pin-bender and anvil so as to isolate from the bending action of the pin-bender that portion of the pin engaging the article.

11. A machine for pinning a ticket to a flexible article, including pin-driving means, an anvil and a cooperating abutment for holding the ticket and article between them in bent condition to be penetrated by the pin, said anvil being yieldingly urged toward the abutment thereby to accommodate articles of various thicknesses, a member adapted for engagement with the shank of the pin between adjacent places of penetration by the pin of the ticket and article, and means for moving said member to a definite engaging position independently of the thickness of the article.

12. A machine for pinning a ticket to a flexible article, the machine including means for holding the article and ticket in bent condition for each to be penetrated twice by a pin driven in an approximately straight line, pin-driving means for causing the pin to penetrate the ticket and article along such approximately straight line, causing the pin to penetrate both the ticket and the article twice, and cooperating die members having a relative movement transverse to the shank of the pin for bending a rear portion of the pin against the ticket to a position displaced in the direction of the article side of the pinned ticket and article, relative to the portion of the pin lying between the penetrations of the article.

13. A machine as claimed in claim 12 in which the die members define an S-bend in the rear portion of the pin.

14. A machine for pinning a ticket to a flexible article, the machine including pin-driving means, means for holding the ticket and article together in bent condition to be penetrated by the pin, a member supporting the shank of the pin at the article side of the ticket between adjacent places of penetration of the ticket and article, and a die engageable with the shank of the pin on the exposed side of the ticket between said member and a point of the pin, said die having a wiping action adapted to bend the pin over said member and against the material of the ticket as said die approaches the point of the pin.

15. In a machine for pinning a ticket to a flexible article, a pin-driving mechanism comprising means defining a pin channel, and a pin-driver operating in said channel, the forward end face of the pin-driver being circular and of approximately the diameter of the pin shank and having therein a conical recess in which a pointed end of a headless pin can seat while the shank of the pin can seat on the bottom of the pin channel.

16. A machine for pinning a ticket to a flexible article, the machine including means for holding the article and ticket in bent condition for each to be penetrated twice by a pin driven in an approximately straight line, means for driving the pin in such line through the ticket and through the article, through the article a second time and through the ticket a second time, and cooperating dies relatively movable between open and closed positions, the dies being positioned to bend a rear end shank portion, which has not penetrated the ticket, of the driven pin, to a position displaced in the direction of the article side of the pinned ticket and article, relative to the main body of the pin lying between the penetrations of the article.

17. A machine as claimed in claim 16 in which a die is engageable with the pin between adjacent places of penetration of the ticket and article.

References Cited in the file of this patent
UNITED STATES PATENTS

| | | |
|---|---|---|
| 1,528,023 | Kohnle | Mar. 3, 1925 |
| 1,625,869 | Plympton | Apr. 26, 1927 |
| 2,083,150 | Flood | June 8, 1937 |
| 2,503,902 | Cunningham | Apr. 11, 1950 |
| 2,813,021 | Sloan | Nov. 12, 1957 |